US006473892B1

(12) United States Patent
Porter

(10) Patent No.: US 6,473,892 B1
(45) Date of Patent: Oct. 29, 2002

(54) DATA DRIVEN, DYNAMIC LANGUAGE DOCUMENT ASSEMBLY SYSTEM

(75) Inventor: Laureston Craig Porter, Tigard, OR (US)

(73) Assignee: Harland Financial Solutions, Inc., Portland, OR (US)

( * ) Notice: Subject to any disclaimer, the term of this patent is extended or adjusted under 35 U.S.C. 154(b) by 0 days.

(21) Appl. No.: 09/224,135

(22) Filed: Dec. 31, 1998

(51) Int. Cl.[7] .................................................. G06F 9/44
(52) U.S. Cl. ........................ 717/106; 717/107; 717/108; 707/506; 707/515
(58) Field of Search ............................... 717/106, 102, 717/100, 101, 116, 107, 108; 707/530, 531, 513, 515, 506, 514, 507, 505

(56) References Cited

U.S. PATENT DOCUMENTS

| | | | | |
|---|---|---|---|---|
| 5,181,162 A | * | 1/1993 | Smith et al. ............. | 707/104.1 |
| 5,313,394 A | | 5/1994 | Clapp ......................... | 707/531 |
| 5,404,435 A | * | 4/1995 | Rosenbaum ................ | 707/515 |
| 5,446,653 A | | 8/1995 | Miller et al. ................. | 705/4 |
| 5,655,130 A | * | 8/1997 | Dodge et al. ................ | 707/511 |
| 5,729,751 A | | 3/1998 | Schoolcraft ................. | 707/530 |
| 5,732,262 A | * | 3/1998 | Gillespie et al. ............ | 707/102 |
| 5,835,087 A | * | 11/1998 | Herz et al. .................. | 345/810 |
| 5,937,189 A | * | 8/1999 | Branson et al. ............. | 717/101 |
| 5,960,419 A | * | 9/1999 | Fagg et al. .................... | 706/59 |
| 5,963,967 A | * | 10/1999 | Umen et al. .................... | 707/1 |
| 5,974,252 A | * | 10/1999 | Lin et al. .................... | 717/108 |
| 6,083,276 A | * | 7/2000 | Davidson et al. ........... | 717/107 |
| 6,243,102 B1 | * | 6/2001 | Ruff et al. .................. | 345/619 |

OTHER PUBLICATIONS

Title: The Envoy Framework: An Open Architecture for Agents, author: Murugappan Palaniappan et al, ACM, Jul. 1992.*

Title: Intermedia: The Architecture and Construction of an Object–oriented Hyper media System and Applications Framework, author: Meyrowitz, ACM, Sep., 1986.*

Title: Toward an object–oriented framework for defining services in future intelligent networks, Greenspan et al, IEEE, 1988.*

* cited by examiner

Primary Examiner—Tuan Q. Dam
Assistant Examiner—Chameli C. Das
(74) Attorney, Agent, or Firm—Daniel J. Bedell; Smith-Hill and Bedell

(57) ABSTRACT

A document assembly system assembles and prints one or more documents in response to input data describing the nature and circumstances of a transaction to be documented and describing the parties to the transaction. The document assembly system initially produces a separate document definition object for each document to be produced and a separate party definition object for each party to the transaction. The document definition object includes procedures for generating "document-related" text that a document may use when referring to itself. The party definition object includes procedures for generating party-related text that the document is to use when referring to a party. The nature of the text each document definition or party definition object procedure produces depends on the nature of the document or the party as indicated by the input data. The system also includes a set of "text generators", blocks of source code which when compiled and executed, generate the text that may be included in a document. When the nature of a word or phrase to be included in a document depends on the nature of the document or on the nature of a party, the text generator refers to the word or phrase by referring to a procedure of the document or party definition object which generates the word or phrase.

20 Claims, 6 Drawing Sheets

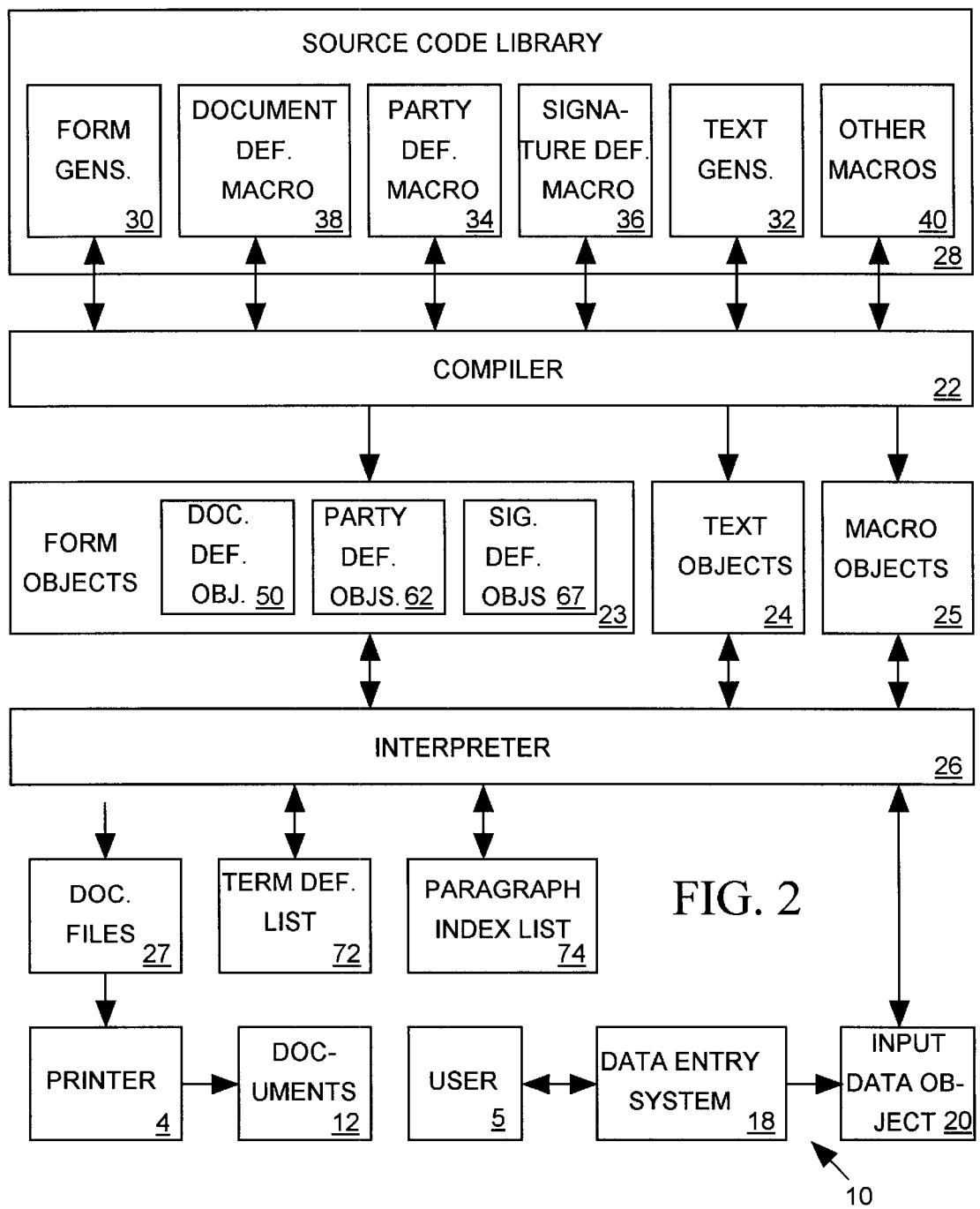

DISBURSEMENT OF LOAN FUNDS. The following provisions relate to the disbursement of Loan funds.
    Application of Advances. (*text of subparagraph*)
    Payments. (*text of subparagaph*)
    •
    •
    Projected Cost Overruns. (*text of subparagaph*)

*(paragraph selection block)*
^HEADING(Title to Property) /130
^(BeginSubjDP1) /132 ^(HasHaveDP1), /134 or on the date of first disbursement
of ^DEFINEDTERM /138 ^(LoanOrAccountWord) /136 proceeds will have, good and marketable title to the ^DEFINEDTERM(^CollWord)) /140 free and clear of all defects, liens, and encumbrances, excepting only liens for taxes, assessments, or governmental charges or levies not yet delinquent or payable without penalty or interest, and such liens and encumbrances as may be approved in writing by ^(ObjectDP2). /142

FIG. 7

TITLE TO PROPERTY. Borrower has, or on the date of first disbursement of Loan proceeds will have, good and marketable title to the Property free and clear of all defects, liens, and encumbrances, excepting only liens for taxes, assessments, or governmental charges or levies not yet delinquent or payable without penalty or interest, and such liens and encumbrances as may be approved in writing by Lender.

DATA DRIVEN, DYNAMIC LANGUAGE DOCUMENT ASSEMBLY SYSTEM

BACKGROUND OF THE INVENTION

1. Field of the Invention

The present invention relates in general to a system for automatically generating documents and in particular to a document assembly system that automatically selects document language in response to input data indicating the nature of a transaction to be documented, describing the parties to the transaction and circumstances surrounding the transaction.

2. Description of Related Art

A form is a template for creating a document in which text can be either fixed when the form is created or part of a variable field to be determined each time a document is created from the form. A simple preprinted form includes the fixed text in preprinted form and represents variable fields with blank spaces, optional words, check boxes and the like to be filled in or selected to create a document. For example a preprinted power of attorney form may include a paragraph such as the following:

residing at do hereby appoint as (my/our) attorney in fact to:

The first blank is filled with the name or names of the party or parties signing the document, the second blank with their address, and the third blank with the name of the person being appointed as attorney. The person filling out the form may strike either "my" or "our" depending on the number of parties. This fill-in-the-blank form system works well for short, simple forms but can be tedious for long forms and produces a document that is partially hand written.

A form can be implemented as a data file to be edited by a word processor. U.S. Pat. No. 5,313,394 issued May 17, 1994 to Clapp teaches that a variable field in a form can appear as an instruction defining the nature of the variable field. For example the above power of attorney form paragraph would appear as follows:

[Party's or Parties' Name(s)] residing at [Party's Address] do hereby appoint [Attorney's Name] as [my/our] attorney in fact to:

Employing a word processing system to create a document from the form, a user scrolls through the form and replaces each instruction or variable name in brackets with data that is appropriate for the document being created. Clapp teaches that an instruction should be embedded in the document in front of the optional text to indicate the conditions under which the optional text is to be included in the document. The end of the optional text is marked by a code such as {END CONDITION}. For example the power of attorney form may include the following lines:

{The following text will be included if this power of attorney is granted for a specific period of time.} This power of attorney shall become effective on [Effective date] and shall terminate on [Expiration date]. {END CONDITION}

When creating a power of attorney document, the user deletes the conditional instruction surrounded by brackets "{ }" and the END CONDITION code, and either deletes or retains the optional text based on the decision outlined in the conditional instruction. The difficulty with such a system is that it requires the user to manually scroll through and edit the entire form which includes all possible language that may be included in the document to be produced. This can be slow and tedious for large forms.

In a "mail merge" system a form is defined by a data file in which a merge code represents each variable field. To create a document, the user or data base program first generates a "merge file" listing text that is to be inserted into the form in place of each merge code in order merge codes appear in the form. The following is an example of the power of attorney paragraph in mail merge form:

^MERGE residing at ^MERGE do hereby appoint ^MERGE as ^MERGE attorney in fact to:

A suitable merge file would include a list of merge data in the following order:

John Smith

555 S.W. 6th Ave, Portland Oreg.

Aaron Jones my

After creating the merge file, the user invokes the mail merge system and provides it with the name of the form file and the name of the merge file. The mail merge system then creates a document by replacing each ^MERGE code in the form with corresponding data included in the merge file. This system does not require the user to manually edit the form, but it may require the user to provide the same information many times in the merge file. For example if there are ten places in a document where the user has to choose between "my" and "our", then the merge file will have to make that choice ten times. Also the user or data base system creating the merge file must be made aware of any changes to the form so as to properly adjust the order in which the data appears in the merge file.

U.S. Pat. No. 5,446,653 issued Aug. 29, 1995 to Miller et al, describes a document generation system that separately stores all paragraphs that might be used in creating an insurance policy document. A policy form is primarily a list of references to the paragraphs that may be included in a policy document. The document generation system merges necessary paragraphs into a policy document as it creates the document. A user supplies the system with data that the system needs to determine which paragraphs are to be included in the document. Such data may, for example, indicate the types of coverage and endorsements, the state in which the policy is to issue, etc. Thereafter, when creating the document, the system invokes a set of rules by which it determines from the input data which paragraphs are to be included in the document. For example if the input data indicates that the policy is to include a certain type of coverage, a rule will tell the system which paragraphs must be included in order to implement that kind of coverage.

U.S. Pat. No. 5,729,751 issued Mar. 17, 1998 to Schoolcraft describes an interactive document assembly system in which codes are embedded in a form at points where a decision must be made as to whether to include or delete a clause, insert a variable field or make a word choice. Each code value is associated with a set of instructions stored in an instruction data base. When creating a document, the system sequences through the form, and whenever it encounters a code it obtains and executes the instructions associated with the code. The instruction may tell the system to query a user for input, or may automatically make choices based on previous queries. For example the power of attorney paragraph would appear as follows:

~4 residing at ~9 do hereby appoint ~3 as ~11 attorney in fact to:

The instructions invoked by codes ~4 and ~9 will tell the system to query the user to input the name or names of the parties and the parties address. The instruction referenced by code 3 may prompt the user for an attorney name. The instructions referenced by code 11 could tell the system to query the user to select between "my" and "our" or could automatically select between "my" and "our" based on whether the user provided more than one party name in response to an earlier query. In addition to handling choice of words, instructions referenced by an embedded code may also determine whether a paragraph should be merged into the document based on user supplied data. One difficulty with this system is that it requires the user to be available for responding to questioning when the document is being created. Since the questions are asked in the order of occurrence as the system scans through the form, the system is not easily adapted for use with user-friendly data entry screens. While such a document generation system is very flexible, a system capable of producing a large number of complex documents could require hundreds of such codes. Programmers would find it difficult to update and maintain such a system without duplicating the content codes.

What is needed is a fully-automated, easily-maintained and easily-updated document generation system that obtains all of the information it needs to prepare a document from a user or a data base and then quickly assembles the document without further human intervention. In particular the system should be able to automatically handle paragraph and word selection during document generation without having to query a user.

SUMMARY OF THE INVENTION

A data driven, dynamic language document assembly system in accordance with the invention automatically produces one or more documents relating to a transaction. The computer-based document assembly system automatically determines which documents are needed and automatically adjusts the text of each document to suit the nature of the document, the circumstances of the transaction and the nature of parties as indicated by user input data.

In accordance with one aspect of the invention, the document assembly system creates a document definition object for each document to be produced. The document definition object includes a set of computer procedures which, when executed, return values or various "properties" of the document, including for example the title of the document (e.g., "Construction Loan Agreement"), the class or subclass of the document (e.g., "loan agreement" and "construction"), and "document-related words" or phrases that are to be used in the document when referencing the document itself (e.g., "Agreement" or "Note").

In accordance with another aspect of the invention, the document assembly system creates a party definition object for each party to the transaction that is to be referenced in a document. The party definition object includes a set of procedures which, when executed, return values of various "properties" relating to the party. Party properties include party-related words and phrases that are to be used in the document when referring to the party as the subject at the beginning of a sentence (e.g., "Lender", "Borrower", "We", "You" or "I"), as a subject inside a sentence (e.g., "Lender", "Borrower", "we", "you" or "I"), the object of a sentence (e.g., "Lender", "Borrower", "us", "you" or "me"), or in possessive form (e.g., "Lender's", "Borrower's", "our", or "my"). Party-related words returned by procedures of the party definition object also include the appropriate singular or plural forms of verbs to be used in the document when a party is the subject of the verb. For example if loan transaction has more than one borrower, then a plain language loan document may use phrases such as "We are" instead of "I am" when referring to the borrowers. The value of an "Am/Is/Are" property of the party definition object is therefore set to "are" instead of "am" so that an "Am/Is/Are" procedure of the party definition object returns the property value "are" when invoked when the word "I" is used as the party subject word.

In accordance with a further aspect of the invention, the document assembly system also creates a signature definition object for each signature block to be included in a document. The signature definition object includes a procedure for creating a signature block in a document. The nature of signature block is controlled by certain signature block properties assigned to the signature block object including, for example, properties indicating the format of the block, title of the party to sign, whether the signature block is to include a seal, date, witness lines, etc.

In accordance with a still further aspect of the invention, the document assembly system also includes a set of "text generators". Each text generator is a source code listing which, when compiled and interpreted, generates text that may be included in a document. A text generator may directly generate text to be printed in a document or may indirectly reference text to be printed in the document by invoking a procedure of a document, party, or signature definition object, or by invoking execution of another text generator. For example, a text generator may include the following code:

^(BegSubjDp1) agree ^(SNullVerbEndDP1) to pay to ^(InsideSubjDP2) on demand all such expenses, together with interest from the date ^(InsideSubjDP2) incur^(SNullVerbEndDP1) the expenses at the rate specified in the ^(NoteWord). However, ^(BegSubjDP1) ^(Have/HasDP1) the right to . . .

In the above code party or document definition object procedures that start with the character "^" return the value of a party or document property to be printed as document text. When the above code is executed, the text it generates depends on the property values such procedures return. For example when the text generator is to produce text for a commercial loan document, the above code might generate the following text:

Borrower agrees to pay to Lender on demand all such expenses, together with interest from the date Lender incurs the expenses at the rate specified in the Note. However Borrower has the right to . . .

However when the text generator is to produce text for a loan document for a non-commercial mortgage, the same text generator might generate the following text:

I agree to pay to Mortgagee on demand all such expenses, together with interest from the date Mortgagee incurs the expenses at the rate specified in the Loan Agreement. However I have the right to . . .

In accordance with another aspect of the invention, a text generator may also employ document or text property procedure names as variables in logic statements that indicate whether text is to be included in a document. For example in the following paragraph code the document text generated by the code between the ^IF() command and the ^:EndIF: code is included in the document only if a document definition object procedure called "DocForm" returns the value "Long":

^IF (EndIF, ^(DocForm)=Long)
^(BegSubjDp1) covenant ^(SNullVerbEndDP1) to pay to ^(InsideSubjDP2) on demand all such expenses, together with interest from the date ^(InsideSubDP2) incur ^(SNullVerbEndDP1) the expenses at the rate specified in the ^(NoteWord). ^(BegSubjDP1) ^(Have/HasDP1) the right to . . .

^:EndIF:

In accordance with a further aspect of the invention, the document assembly system also includes a set of "form generators", each associated with a separate type of document that the system may produce. Each form generator is a source code listing which, when compiled and interpreted, determines whether the associated document is to be produced based on the nature and circumstances of the transaction as indicated by user input data. If the document is needed, the form generator creates the document, party and signature definition objects for the document and generates the text to be included in the associated document either directly or indirectly by invoking execution of one or more compiled text generators.

In accordance with another aspect of the invention, the system automatically generates a paragraph index and a terms definitions list and inserts them into a document.

It is accordingly an object of the invention to provide a document assembly system that automatically produces one or more documents relating to a transaction.

It is another object of the invention to provide a document assembly system that automatically selects document text, including words, phrases and paragraphs based on the characteristics of the transaction being documented, characteristics of the document and characteristics of the parties referenced by the document.

It is a further object of the invention to provide a document assembly system that is easy for programmers to update when changes to laws, regulations and policies require changes to text of the documents the system produces.

The concluding portion of this specification particularly points out and distinctly claims the subject matter of the present invention. However those skilled in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS(S)

FIG. 1 illustrates a computer system for implementing a data driven, dynamic language document assembly system in accordance with the present invention;

FIG. 2 illustrates in data flow diagram form software and data structures forming a data driven, dynamic language document assembly system in accordance with the invention;

FIG. 7 illustrates an example of source code that may be included in a text generator of FIG. 2 that generates a single paragraph;

FIG. 8 illustrates an example of a document paragraph the text generator of FIG. 7 generates;

DESCRIPTION OF THE PREFERRED EMBODIMENT(S)

Figure 3:
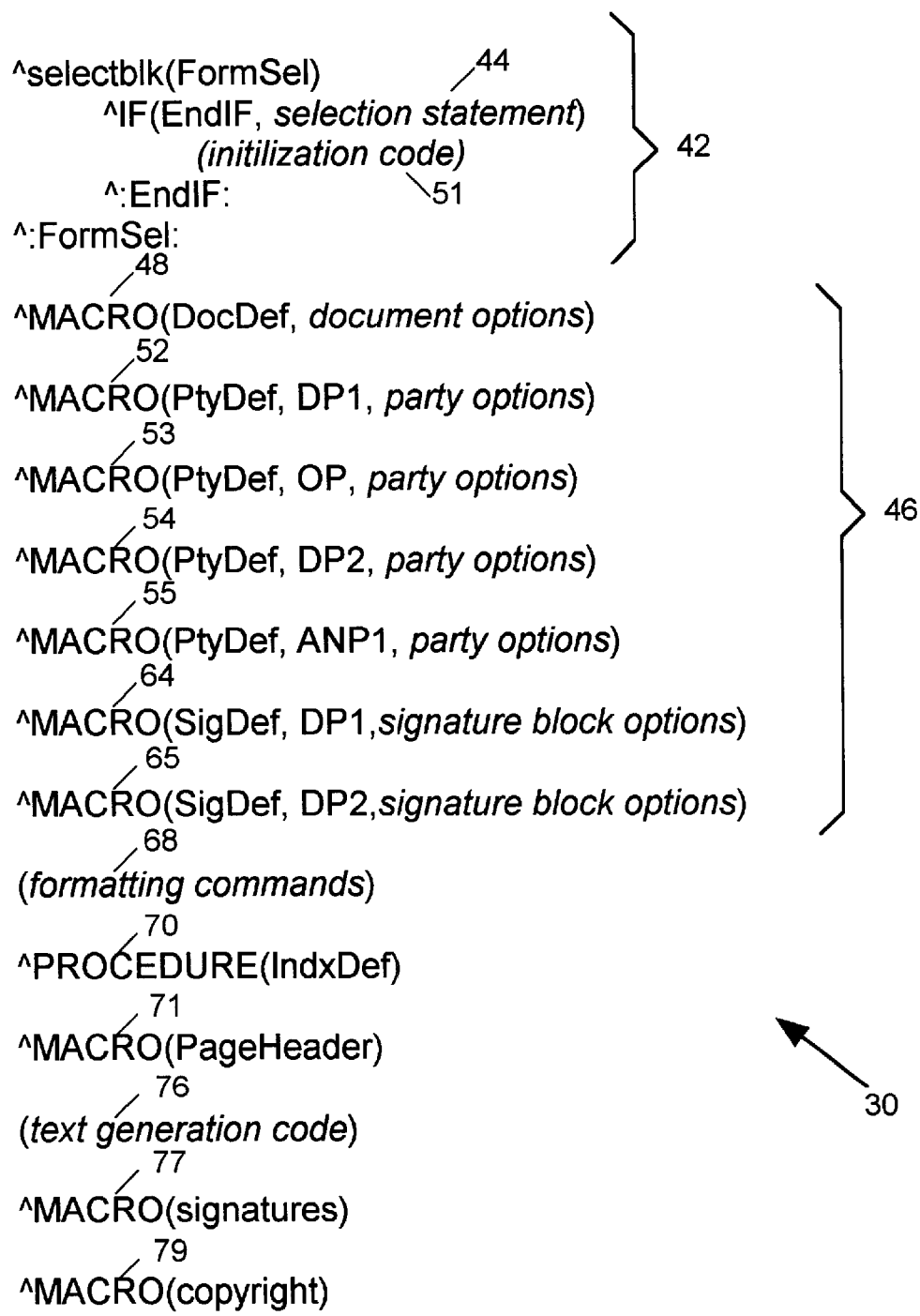
FIG. 3 is an example of source code included in a typical form generator of FIG. 2.

The present invention relates to a computer-based document assembly system that automatically assembles and prints documents in response to data provided by a user describing a transaction to be documented and parties to the transaction. FIG. 1 illustrates a computer system 1 suitable for implementing the invention. Computer system 1 includes a conventional computer 2 providing a user interface (e.g., screen, mouse and keyboard), a hard disk 3 or similar bulk storage device, and a printer 4. When programmed in accordance with the invention, computer system 1 queries a user 5 for the input data and executes software stored in disk 3 which assembles the necessary documents and prints them on printer 4. In the preferred embodiment of the invention as described herein, the document assembly system produces various documents used by banks and other institutions in connection with lending transactions such as, in the case of banks, loan agreements, promissory notes, security agreements and the like. However the system can be easily adapted to handle documents for other types of transactions.

Many factors can influence the content of a document. For example, a typical loan agreement includes a header reciting the title of the document such as "Business Loan Agreement" or "Construction Loan Agreement", boxes indicating loan amount and relevant dates, and the names and addresses of the parties to the agreement. The type of loan being made affects the content the loan agreement. A business loan agreement and a construction loan agreement may have many paragraphs in common, but each type of loan agreement will have paragraphs that are specific to that kind of document. Various words or phrases used in a loan agreement may depend on the nature of the parties to the transaction. For example a loan document for a commercial consumer transaction may refer to a commercial borrower as "Borrower" regardless of the number of borrowers. On the other hand, a loan document in a consumer transaction may refer to a single non-commercial borrower as "I" or may refer to multiple non-commercial borrowers as "we". The same considerations influence choice of possessive forms (e.g., "my" vs. "our"). The choice of pronoun form can also influence choice of verb forms (e.g., "agree" vs. "agrees" or "has" vs. "have").

Since many state laws and regulations or the individual preferences of banks making loans can affect the content of loan agreements, including whether certain paragraphs are included, choice of words within a paragraph, and the manner in which the agreement defines various words and phrases.

In order to provide great flexibility in the documents it produces, the document assembly system of the present invention automatically determines which documents are needed for a particular transaction, automatically determines which paragraphs should be included in each document, and automatically generates the text of each document paragraph. As it generates document text, the system automatically selects text language to suit the nature of the document to incorporate the text and to suit various aspects or circumstances of the particular transaction represented by the document.

Software Architecture

FIG. 2 illustrates in data flow diagram form software and data structures forming a data driven, dynamic language document assembly system 10 in accordance with the invention. System 10 includes a conventional data entry system 18 for obtaining input data from user 5 describing various aspects of a transaction to be documented. Data entry system 18 may, for example, present user 5 with one or more data entry screens and allow the user to fill in blanks and check blocks in order to set the values of various data variables indicating the nature and circumstances ("properties") of a transaction to be documented and describing the parties to the transaction. Since systems capable of implementing the function of data entry system 18 are well-known to those skilled in the art, data entry system 18 is not further detailed herein.

When data entry system 18 has obtained all necessary input data from the user, it generates an input data structure or "object" 20 and passes it to an interpreter 26 which controls the assembly and printing of documents 12. Input data object 20 organizes the user input data into a set of properties or variables that interpreter 26 may consult when determining which documents 12 to produce and when determining how to adjust the content of each document 12. As it produces documents 12, interpreter 26 interprets object code contained in a set of form objects 23, a set of text objects 24 and a set of macro objects 25 produced by a compiler 22. Compiler 22 creates objects 23, 24 and 25 by compiling a source code library 28 created by programmers. Compiler 22 recompiles source code library 28 when it is necessary to update form objects 23, text objects 24 or macro objects 25 to incorporate programmer changes to source code objects in library 28.

Source code library 28 includes a set of "form generators" 30, each associated with a separate kind of document 12 that may be produced. Each form generator 30 includes source code indicating the circumstances (e.g., type of transaction) under which interpreter 26 is to generate the associated document, code selecting various structural features of the document, code selecting certain properties to be used when generating the document, and code selecting blocks of text to be included in the body of the document.

In making such selections, each form generator 30 references procedures included in various other objects of source code library 28. Procedures of a document definition macro 38 return various properties of the associated document including words or phrases to be used in the document when referring to the document itself. A party definition macro 34 includes a set of procedures that return words or phrases relating to a party that may be referenced in a document. A signature definition macro 36 includes a set of procedures for controlling the appearance of a signature block on a document to be signed by the parties. Other source code macros 40 control document formatting operations such as, for example, paragraph indentation, creation of a paragraph index or creation of a list of word definitions. Each of a set of text generators 32 includes source code for generating a block of text such as, for example, a paragraph or group of paragraphs, that may be included in a document.

When a programmer has made changes to source code library 28, compiler 22 may be invoked to recompile the source code library 28. Compiler 22 generates a separate form object 23 for each form generator 30. Each form object 23, when executed by interpreter 26 generates a separate document. Compiler 22 generates a separate text object 24 as it compiles each text generator 34. Each text object 24, when executed by interpreter 26 generates one or more paragraphs of formatted text that may be included in a document. Compiler 22 generates a separate macro object 25 as it compiles each macro 40. Each macro object 25 includes one or more procedures that may be invoked to tell interpreter 26 various activities, for example, how to generate printer formatting codes, how to add certain graphics such as logos to a document, etc. As it compiles each form generator 30, compiler 22 also creates and compiles instances of document, party and signature definition macros 34, 36 and 38 referenced by the form generator 30 and incorporates them into the form object 23 as a set of document, party and signature definitions objects 50, 62 and 67.

Thereafter, when one or more documents 12 are to be assembled and printed in response to user input data 20, interpreter 26 executes the compiled code of form objects 23, text objects 24, and macro objects 25 to produce a document files 27 defining the documents to be printed. Interpreter 26 then sends the document files to printer 4 which prints the documents 12.

Form Generator

FIG. 3 is an example source code organization in a typical form generator 30. Form generator 30 includes a form selection block 42 starting with ^selectblk(FormSelect) statement and ending with a "^:FormSelect:" code. Selection statement 42 includes an IF statement ending with an "^:EndIF:" code. The IF statement includes a selection statement 44 indicating conditions under which the form is to be printed. For example if the document associated with the form is only needed for construction loans, then selection statement 44 may include "LoanType=Construction". This means that the document associated with the form is needed only if a LoanType variable included in input data 20 has value "Construction". Or, for example, if the form is needed only for construction loans in the state of Texas, then the selection logic statement would be "(LoanType=Construction) and (DocST=Texas)", where DocST is a variable of input data object 20 indicating the state having legal jurisdiction over the transaction.

An object code version of selection statement 44 appears in the compiled version of the form generator 30, one of form objects 23. When it is ready to begin generating documents in response to user input data, interpreter 26 evaluates the selection statement included in each and every available form object 23 in view of the data 20 provided by the user to determine whether the document the form object 23 specifies is needed. When selection statement 44 of a form object evaluates false, interpreter 26 does not print the document. When selection statement 44 evaluates true, interpreter 26 prints the document specified by the form object 23.

Form generator 30 includes a set of MACRO commands 46. A first MACRO command 48 tells compiler 22 to create a document definition object 50 (FIG. 2), a compiled instance of document definition macro 38, and to include it as a part of the form object 23. Document definition object 50 includes a set of procedures that return properties of the specific document to be printed. Interpreter 26 may later carry out any of those procedures when generating the document. For example, various procedures of the document definition object 50 return document-related text such as words or phrases (e.g., "Construction Loan Agreement" or "Agreement") to be used in a document when the document refers to itself. The MACRO command 48 that creates the document definition object 50 includes "options" data that select the various document properties that those procedures of document definition object 50 return when interpreter 26 invokes them.

Referring again to FIG. 3, a set of MACRO commands 52–55 tell compiler 22 to create a corresponding set of party definition objects 62 (FIG. 2) as part of the form object 23 being compiled. Each party definition object 62 is associated with a separate party referenced by the document the form object 23 specifies, and is a compiled instance of party definition macro 34. Each party definition object 62 includes a set of procedures which, when executed, return values of various "party-related" properties. Party-related property values include, for example, nouns or pronouns such as"Borrower" or "I" to be used in the document when referring to a party, and forms of various verbs such as "am," "is" or "are" to be used in the document when the party is the subject of a sentence. Each MACRO command 52–55 that creates an instance of a party definition object 62 includes a list of options that tell compiler 22 how to select the party-related property values that the procedures of the party definition object 62 return.

Referring again to FIG. 3, the next two MACRO commands 64 and 65 tell compiler 22 to create two signature definition objects 67 and to include them as part of the form object 23. Each signature definition object is a compiled instance of signature definition macro 36 and includes a procedure for producing a signature block at the end of the document. Option data included the MACRO commands 64 and 65 that create each signature definition object 67 select various properties of the signature block that it produces including, for example, the number of signatures in the block, the size and spacing of the line, whether the signature block is to include a date line, one or more witness lines, a seal, or the signer's social security number. The options data also indicates particular words or phrases such as "Borrower", "Lender", "Beneficiary", "Pledgor", "Owner", "Grantor", "Landlord", "Mortgagee", "Mortgagor", "Depositor", "Assignee", "Financial Institution", "Debtor" and the like that are to appear in the signature block.

Following a set of formatting macros 68 which tell interpreter 26 to set certain document formatting options (e.g., font type and size), form generator 30 includes a command 70 invoking an IndxDef procedure 70 of document definition object 50. If the document is to include a paragraph index or a list of term definitions, the IndxDef procedure 70 tells interpreter 26 to initialize a term definition list 72 for holding a list of terms to be defined in the document and a paragraph index list 74 for holding the paragraph index as it is created. As the interpreter 26 later assembles the document, it adds an index item to paragraph index list 74 whenever it adds a paragraph to the document. Interpreter 26 also adds a word or phrase to term definition list 72 whenever it adds a paragraph containing a word or phase that must be defined in the document. When all paragraphs have been included in the document, interpreter 26 generates and inserts the paragraph index and/or the term definition list into the document file 27 before printing the document.

A next MACRO command 71 of FIG. 3 invokes a "PageHeader" macro, one of macro objects 25. This macro tells interpreter 26 to generate a document header that may include, for example, the title of the agreement, boxes containing loan amount and relevant dates, the names and addresses of the parties, and other options based on values of properties returned by procedures of document definition object 50.

As described in more detail below, text generation code 76 included in form generator 30 indirectly generates the body of the document text by invoking various text objects 24, compiled versions of text generators 32. Each text object 24 tells interpreter 26 how to generate and format document text either directly by providing the text itself or indirectly by invoking other text objects 24 which produce text. Text generation code 76 may also include various formatting MACRO commands and logic statements.

Following the text generation code 76, which has the effect of generating the formatted text of the main body of the document, a MACRO command 77 invokes a "signatures" macro object 25 that creates the document's signature blocks based on the properties returned by procedures included in signature definition object 67 (FIG. 2). A last MACRO command 79 invokes a macro object 25 that adds a copyright notice to the document.

Text Generation Code

Figure 4:
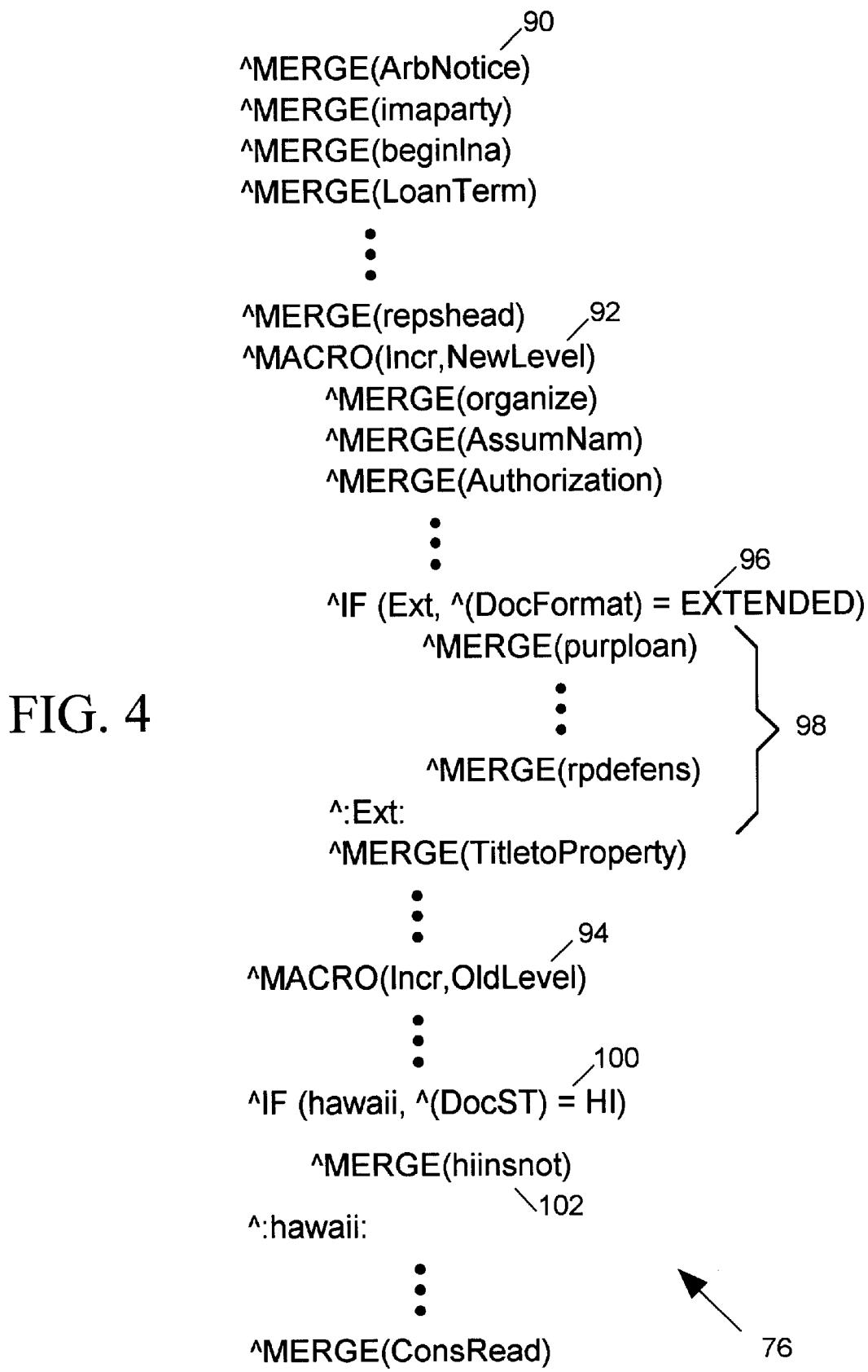
FIG. 4 is an example of text generation code included in the form generator code text of FIG. 3 that indirectly generates all the text of a document.

FIG. 4 illustrates an example of the text generation code 76 that may appear in the form generator 30 of FIG. 3. Text generation code 76 defines the main body of a construction loan agreement document. The particular text generation code 76 illustrated in FIG. 4 does not directly generate any text to be included in the document (though it could), but instead includes a set of MERGE commands 90, each referencing a text object 24 capable of generating one or more paragraphs of text to be included in the construction loan agreement document. Text generation code 76 of FIG. 4 lists the MERGE commands in the order in which interpreter 26 is to execute them. The text generation code 76 of FIG. 4 also includes various MACRO commands for controlling document formatting. For example MACRO command 92 indicates that subsequent paragraphs are to be indented from the preceding paragraphs by one tab and that their headings should be mixed-case as opposed to the all upper case of left-most paragraphs. MACRO command 94 indicates that indentation of subsequent paragraphs is to be reduced by one tab.

Text generation code 76 also includes conventional program flow control statements such as IF statements 96 and 100. IF statement 96 indicates that when a document definition procedure "DocFormat" included in the document definition object 50 returns the value "EXTENDED", then a set of MERGE commands 98 is to be executed. Otherwise MERGE commands 98 are to be ignored. IF statement 100 indicates that MERGE command 102 is to be executed only if the document is under the jurisdiction of the state of Hawaii (HI) as indicated by the value of a parameter "DocST" included in input data 20.

Text Generator

Figures 5, 6:
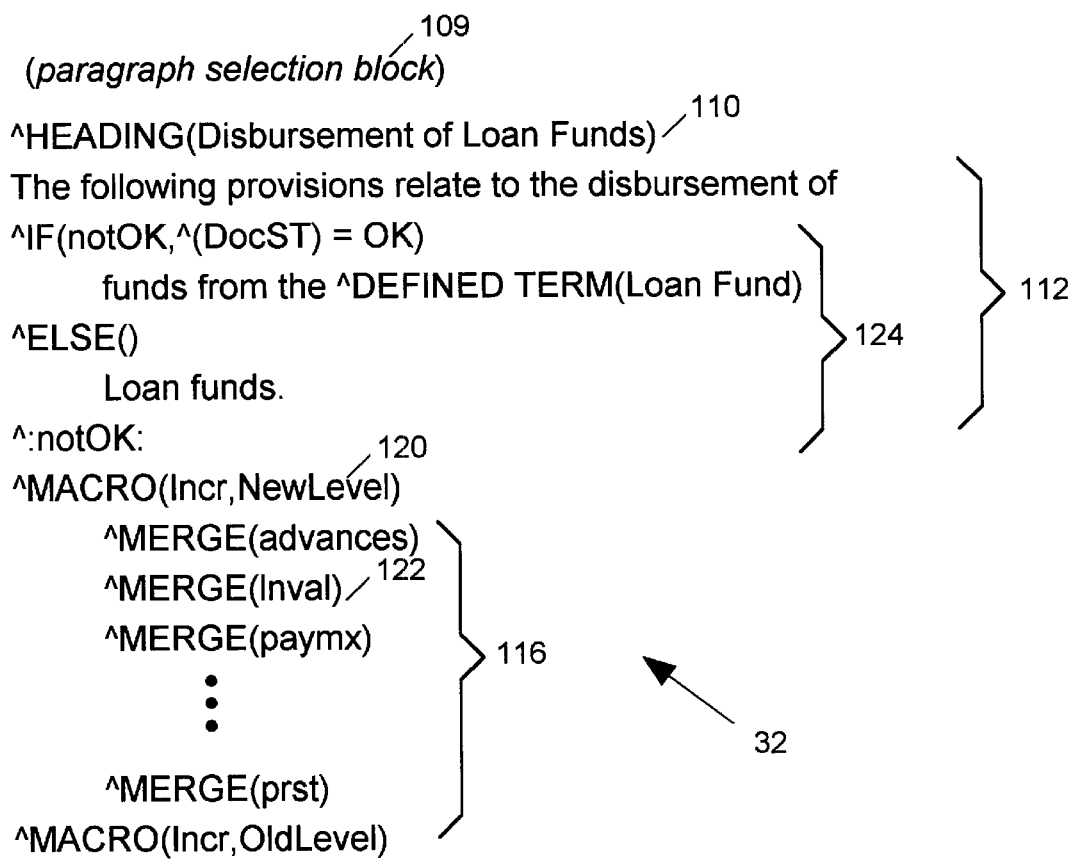
FIG. 5 is an example of source code of a text generator of FIG. 2 that generates a paragraph and several subparagraphs.
FIG. 6 is an example of document text that the text generator of FIG. 5 generates.

FIG. 5 illustrates an example of a text generator 32 which when compiled into a corresponding text object 24 can generate a main paragraph and several subparagraphs. FIG. 6 is an example of document text that the text generator of FIG. 5 can generate. Referring to FIGS. 5 and 6, the text generator 32 includes a paragraph selection block 109, similar to form selection block 44 of FIG. 3, indicating conditions under which interpreter 22 is to include in the document the text defined by the remaining code of text generator 32.

A HEADING command 110 indicates a paragraph heading ("DISBURSEMENT OF LOAN FUNDS") that is to be printed in bold capitals at the beginning of a first paragraph 114. The interpreter 26 adds that heading to the paragraph index list 74 (FIG. 2) when the document is to include a paragraph index. A next section of source code 112 directly generates the text of the first paragraph 114 to be printed. A set of MERGE commands 116 invoke other text objects 24 (FIG. 2) that generate the text of each of a set of subparagraphs 118. A MACRO command 120 indicates that the subparagraphs 118 produced by MERGE commands 116 are to be indented by one tab stop. Note in comparing FIGS. 5 and 6, that one MERGE command 122 did not produce a corresponding one of subparagraphs 118. This occurred because the paragraph selection block included in the text object referenced by MERGE command 120 indicated that the subparagraph was in this case unnecessary in view of transaction conditions indicated by input data 20.

Control statements embedded in text generator 32 can control the manner in which text is selected. For example, an IF/ELSE statement 124 within the block of code 112 defining the text of first paragraph 114 selects between two versions of a phrase depending on whether the loan is made in the state of Oklahoma (OK). The decision is based on the value of the DocST property of the input data object 20 (FIG. 2) indicating the state having jurisdiction over the transaction. The state of Oklahoma has a unique legal definition for the term "Loan Fund" and that terminology should be used in loan documents over which Oklahoma has jurisdiction. A command DEFINED TERM following the term "Loan Fund" in the Oklahoma version of the phrase indicates that when the document is to include a list of term definitions, the term "Loan Fund" must be included in the term definitions list 72 (FIG. 2). In such case the Oklahoma definition of the term "Loan Fund" will be added to the term definitions section of the document.

FIG. 7 illustrates source code that may be included in a text generator 32 of FIG. 2 that defines the text of a single paragraph. FIG. 8 illustrates an example of a document paragraph the text generator of FIG. 7 can generate. Referring to FIGS. 7 and 8, a HEADING command 130 produces the paragraph heading "TITLE TO PROPERTY" while the remaining code of FIG. 7 generates the remaining text of the paragraph of FIG. 8.

A word or a phrase to be included in text defined by a text generator 32 may depend on the nature of the parties to the transaction or on the nature of the document in which the text is to be included. Text generator 32 represents a variable word or phrase by the name of a procedure of the party definition object 62 or document definition object 50 associated with the party or document. For example a party definition procedure 132 "BeginSubjDP1" returns a word that is to be used in the text when referring to a party at the start of a sentence. In this case, the value ("Borrower") of this variable is returned by the "BeginSubj" procedure of the party definition object 62 (FIG. 2) called "DP1". As it executes the text object 24 that is the complied version of the text generator 32, interpreter 26 replaces each instance of "^(BeginSubjDP1)" in the generated text with the word "Borrower" returned by the BeginSubjDp1 procedure of the DP1 party definition object 62.

The text that party definition procedure "BeginSubjDP1" returns depends on the party definition properties assigned to the party definition object 62 when it was compiled. For example if the document had been intended for use in a consumer transaction, as opposed to a commercial transaction, the BeginSubjDP1 procedure of the party definition object 62 might return the property value "I" instead of the property value "Borrower". Thus interpreter 26 would replace each instance of "^(BeginSubjDP1)" in the generated text (FIG. 8) with the word "I".

The value returned by a next DP1 party definition object procedure 134 "HasHaveDP1" may be either the verb "has" or the verb "have" depending on the nature of the transaction and the property values of the DP1 party definition object 62. In this case, since the document arises out of a commercial transaction and refers to the borrower as "Borrower" instead of "I", the value of "Have/Has" party definition object property the HasHaveDP1 procedure returns is "has". Thus the verb "has" is printed following "Borrower" in the resulting document paragraph (FIG. 8).

The text generator of FIG. 7 invokes a procedure "^(LoanOrAccountWord)" 136 of a document definition object 50 (FIG. 2) to obtain a word such as "Loan" or "Account" when referring to a loan or account that the document references. That choice of words may, for example, depend on the circumstance of the transaction. Since interpreter 26 set the value of a "LoanOrAccountWord" property of document definition object 50 to "Loan" when it created the document definition object, the ^(LoanOrAccountWord) procedure returned the word "Loan". That word therefore appears in the printed paragraph as shown in FIG. 8. Similarly a procedure 142 "^(ObjectDP2)" of the party definitions object 62 (FIG. 2) called "DP2" associated with the lender party returned the word "Lender" which appears in the document paragraph of FIG. 8.

A "^DEFINEDTERM( )" command 138 tells the interpreter 26 that the value ("Loan") returned by a procedure ^(LoanOrAccountWord) of document definition object 50 is to be added to term definitions list 72 (FIG. 2). Another ^DEFINEDTERM( ) command 140 indicates that the term (in this case "Property") returned by another document definition object procedure "^COllWord" is also to be included in the term definitions list.

Document Definition Object

Table I lists the names various procedures of document definition object 50 that interpreter 26 creates when executing the compiled version of a form generator 30.

TABLE I

| Procedure | Purpose |
| --- | --- |
| DocType | Returns document type |
| DocSubType | Returns document subtype |
| DocHeaderType | Returns header style |
| DocTitle | Returns document title |
| DocShortTitle | Returns short form of document title |
| DocFormat | Returns format |
| DocLang | Returns document language type |
| DocOptions | Returns options |
| OptionWords | Returns optional words based on the transaction |

Each text generator 32 invokes a document procedure either to obtain values of document properties to be used as text in the document or to be used as variables in paragraph selection or program flow statements. The DocType procedure returns a document type property value such as "Loan Agreement" or "Real Estate Document" that classifies the document by major type. The DocSubType procedure returns a property value such as "Construction Loan Agreement" or "Assignment" that classifies the document by subtype. A paragraph selection statement or control flow statements such as IF statements included in a text generator can use the Doctype and DocSubType property values when deciding whether text ought to be included in a document.

The DocTitle and DocShortTitle procedures return values of long and short forms of words (such as "Construction Loan Agreement" and "Agreement" that are to be used in the document when referring to the document itself. The DocFormat procedures returns the value of a property indicating whether the document-is a standard, extended or short form document. Text generators can use this property when determining whether certain paragraphs are to be included in the document. The DocLang procedure returns a "document language" property value indicating whether the document is to include paragraph forms having language that is geared to business clients or is to include paragraph forms having language geared to consumer clients or wording based on the aspects of the transaction.

A DocOptions procedure returns a property value referencing various options that may be included in the document. The interpreter calls this procedure to determine which options to include in the document. For example the DocOptions property value might be "_printnames_printboxes_printlogo_Definitions_".

This DocOptions property value indicates that the document is to define the parties in the header, that a set of boxes containing loan information (amount, dates etc.) is to be printed at the top of the document, and that the document is to include term definitions. In this case, since the word "Index" is not included in the DocOptions property value, the document will not include a paragraph index.

The document definition object also includes a set of "option word" procedures that return particular words of phrases that may be used in text when it is necessary to provide a choice of words. For example, a "CollWord" procedure returns a word such as "Property" or "Collateral" to be used when referring to property being used as collateral. Since the particular word to be used may depend on the type of document, the choice of words is made by the "CollWord" procedures. A "LoanOrAccount" option word procedure may return a word such as "Loan" or "Account" to be used when a document refers to a loan or account. The document definition object may include several hundred such option words.

Party Definition Object

Table II lists various procedures of a party definition object 62 that interpreter 26 may invoke.

TABLE II

| Procedure | Purpose |
| --- | --- |
| PartyCode | Returns input data for party |
| HeaderName | Returns formal party title |
| BegSubj | Returns subject, sentence start |
| InsideSubj | Returns subject, inside sentence |
| BegPoss | Returns possessive, sentence start |
| InsPoss | Returns possessive, inside sentence |
| Object | Returns direct object |
| HaveHas | Returns "have" or "has" |
| DoDoes | Returns "do" or "does" |
| AmIsAre | Returns "am", "is" or "are" |
| SNullVerbEnd | Returns verb ending |
| Name | Returns party name |
| Address | Returns party address |
| NameAddress | Returns party name and address |
| Street | Returns the street of the party |
| Zip | Returns party zip code |

Each text generator 32 invokes these party definition object procedures to obtain party-related text.

The PartyCode procedure returns a party code property value such as "DP1", "DP2", "OP", etc., that refers to a block of input data 20 (FIG. 2) containing information about the party such as the names and addresses of the individuals or business entities that form the party. The party code property is used as a suffix to all procedure names. Thus, for example, for the party definition object relating to party DP1 ("DocumentPartyone"), the "HeaderName" procedure is referenced as "^HeaderNameDP1".

The HeaderName procedure returns the header name property value, the formal title of the party to be used, for example, in the document header (e.g., "Borrower" or "Grantor"). The BegSubject procedure returns the subject word or phrase (e.g., "Borrower", "Grantor", "I", "We") that is to be used at the start of sentences when referring to the party. The InsideSubj procedure returns the subject word for party to be used inside sentences (e.g., "Borrower", "Grantor", "I", "we"). The BegPoss procedure returns the possessive word for the party (e.g., "Borrower's", "Grantor's", "Our", "My") that is to be used at the start of sentences when referring to the party. The InsPoss procedure returns the possessive word for the party appearing inside a sentence (e.g., "Borrower's", "Grantor's", "our", "my", "your"). The Object procedure returns the word for the party when appearing as the object of a sentence (e.g., "Borrower", "Grantor", "me", "us"). The procedures HaveHas, DoDoes, and AmIsAre each return the particular forms of verbs to be used in sentences in which the party is the subject of the verb. The SNullVerbEnd procedure returns a value of "s" if an "s" is to be appended to certain verbs and a null value if an "s" is not to be appended to the verbs. For example if a party is called "Borrowers", a phrase "Borrower grants" may appear in a document but if the party is called "I" then the phrase "I grant" should appear in the document. The SNullVerbEnd procedure determines whether the verb appears as "grant" or "grants". Special verbs like "certify" are determined with a PartyVerb procedure.

A Name procedure returns any part or all of the party's name, the Address procedure returns any part or all of the party's address and a NameAddress procedure returns the party's name and address. For example, a procedure call for Names, DP1, LastOnly appearing in a text or document object will return the last name(s) of the DP1 party.

The options data in a macro command that creates a party definition object 62 establishes various other property values returned by the procedures of the object. For example, the Names procedure may use an option such as "LastPrint" to print the names as "Public, John Q." rather than the normal "John Q. Public."

Signature Definition Object

Table III lists the names of various properties of a signature definition object 67 that interpreter 26 creates when executing the compiled version of a form generator 30.

TABLE III

| Property | Purpose |
| --- | --- |
| PartyCode | References input data for signer party |
| WitLines | Selects number of witness lines |
| NumLines | Selects number of signatures per line |
| SigHeader | Indicates signature block header text |
| Shaded | Indicates whether block is shaded |
| Date | Indicates whether date is included |
| Seal | Indicates whether seal is included |
| SSN | Indicates whether Social Security number is included |
| NumBlankSigs | Returns number of blank signature blocks |
| BlankSigTitle | Returns title for blank signature blocks |

The PartyCode property ("DP1", "DP2" etc.) references the input data structure defining the party to sign the document. The Signers property selects a number of individuals that are to sign on behalf of the party and the Witlines property indicate the number of witnesses that are to sign. The NumLines property determines the number of signers to appear on one line of the document. The SigHeader property indicates the text to use (e.g., "Borrower") in the signature block header. The Shaded, Date, Seal and SSN properties whether block is to be shaded or include a date, a seal or the signer's social security number. The NumBlankSigs procedure returns the number of blank signature blocks to be included in the document and the BlankSigTitle procedure returns the title of the signer (e.g., "Authorized Signer", "Borrower"), if any, to be printed under each signature.

Rules

Many factors affect the content of a document, including the nature of the document, laws of the legal entities having jurisdiction over the transaction being documented, the nature of the parties to the transaction, preferences of the institution making the loan, etc. The factors that influence document content appear as variables or procedures in source code "rules". Source code library 28 is organized in a way that reduces the opportunity for duplication of code implementing such rules and reduces the difficulty of changing source code to reflect changes in rules.

For example any factor that influences the manner in which a document refers to a party need appear only as a source code rule implemented by procedures of party definition macro 34. Assume that the state of Arkansas, and only Arkansas, requires a party's name (e.g., "Robert Smith") be included in a particular type of loan document after its first occurrence of a term such as "Borrower" referring to the party in the document. The ^BegSubj procedure of the party definition object implement this rule by determining whether the document is of the type where the Arkansas rule applies and whether the procedure is being invoked for the fist time in a document. If so, the ^BegSubj procedure appends the name of the party when the first time it returns the BegSubj property value "Borrower".

Note that it is not necessary for a programmer creating or updating any text generator 32 to provide any code in that source code object to implement this rule or any other rules regarding the manner in which a party is referenced at the beginning of a sentence. It is not even necessary for the programmer to be aware of any such rules. All the programmer needs to know when producing the text generator 32 is that whenever the text is to refer to a party as a subject of a sentence, it should do so by referencing the ^BegSubjDP1 procedure. The procedure implements all relevant rules for determining how to refer to the party. Thus if it is necessary to changes the way a documents refer to a party as a result of a rule change, there is no need to modify the code of any of thousands of text generators 32 that may refer to that party. It is necessary to change only the code defining one or more procedures of the party definition object 52. The same considerations apply when implementing rules that affect documents and signature blocks. If a rule affects only a particular kind of document, then that rule is best implemented in the code of the associated form generator 30. If a rule affects language of all documents, it is best implemented in the document definition macro 38. If a rule affects the way signature blocks are created in all documents, it is best implemented in the signature definition macro 36.

A rule of the type which affects whether a particular paragraph is included in a document or the particular wording of that paragraph can be implemented in the code of the particular text generator 32 that defines the paragraph. This makes it unnecessary for every form generator 30 defining a document that may include the paragraph to also include code that determines whether or not the paragraph should be included or how it should be modified. Each form generator 30 that may incorporate the paragraph need simply reference it with a MERGE command. Whether or not the paragraph text is actually merged into the document or how it may be modified is determined by rules incorporated into the code of text object 24 that generates the text. Thus when there is a change in a rule affecting when the paragraph should be included in any document or how the text is to appear, it is necessary to modify only the paragraph selection or text generating code of the text generator 32 that defines the paragraph. It is not necessary to modify code of any form generator 30 that may seek to merge the paragraph into a document.

The flexibility of the system allows in placement of code implementing rules permits such code to be used efficiently without duplication.

Term Definitions List and Index

As previously mentioned, each text generator includes a ^DEFINEDTERM( ) command to indicate when a word or phrase of document text is a term to be defined in the document. If the document is to include a term definition list, then when interpreter 26 (FIG. 2) encounters a DEFINEDTERM command, it not only includes the word or phrase referenced by the command in the document text, it also includes the term in definition list 72. For each defined term on the list, there is a corresponding text object 24 that generates the text of the term's definition. After generating the document file 27 containing all of the document's normal text, interpreter 26 alphabetically sorts term definition list 72 and then interprets the compiled version of the each term's associated text object 24 in the order the words occur in the sorted list, thereby generating a definition paragraph for each word. The interpreter inserts the definition paragraphs into document file 27 before it is printed.

When the document is to include a paragraph index, interpreter 26 appends each paragraph heading and appropriate printer format control codes to index list 74 whenever it adds a paragraph to document file 27. Interpreter 26 then inserts index list 74 into document file 27 before printing the document file so that the document 12 includes the index.

Interpreter

Figure 9:
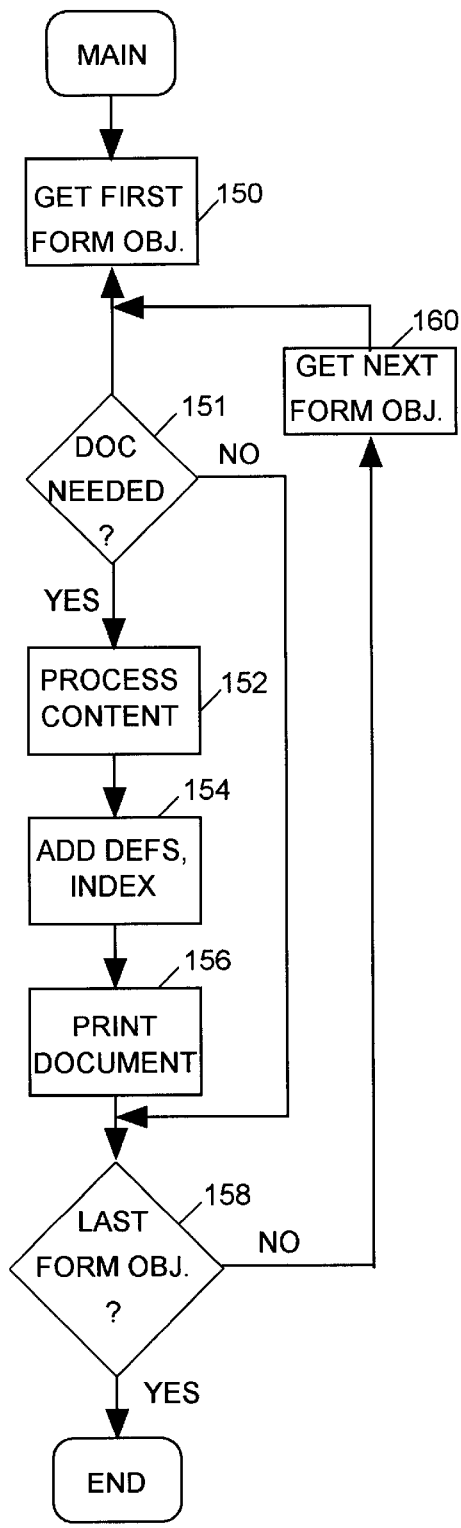
FIG. 9 is a flow chart illustrating a main routine executed by the interpreter of FIG. 2.

FIG. 9 is a flow chart illustrating a main routine of interpreter 26. Interpreter 26 initially obtains a first of the compiled form objects 23 (step 150) and evaluates its document selection block to determine whether the document defined by the form object is needed (step 151).

If the document is needed, interpreter 26 executes a "process content" subroutine (step 152) by which it processes the content of the form object, thereby generating the formatted document text to be inserted into document file 27 (FIG. 2), and generating the term index definition list 72 and index list 74. Interpreter 26 then processes and adds the term definitions and paragraph index to the document file 27 when necessary (step 154) and sends the document file to the printer 4 (step 156). After step 151 if the document is not needed, or after printing the document at step 156, the interpreter determines whether the form object just processed is the last of the set of available form objects 22 (step 158). If not, interpreter 26 obtains the next form object (step 160) and repeats steps 151 through 158. Interpreter 26 continues to process each available form object 22 and, when needed, prints the document it defines. When it determines at step 158 that it has processed all of the available forms, interpreter 26 ends its operation.

Figure 10:
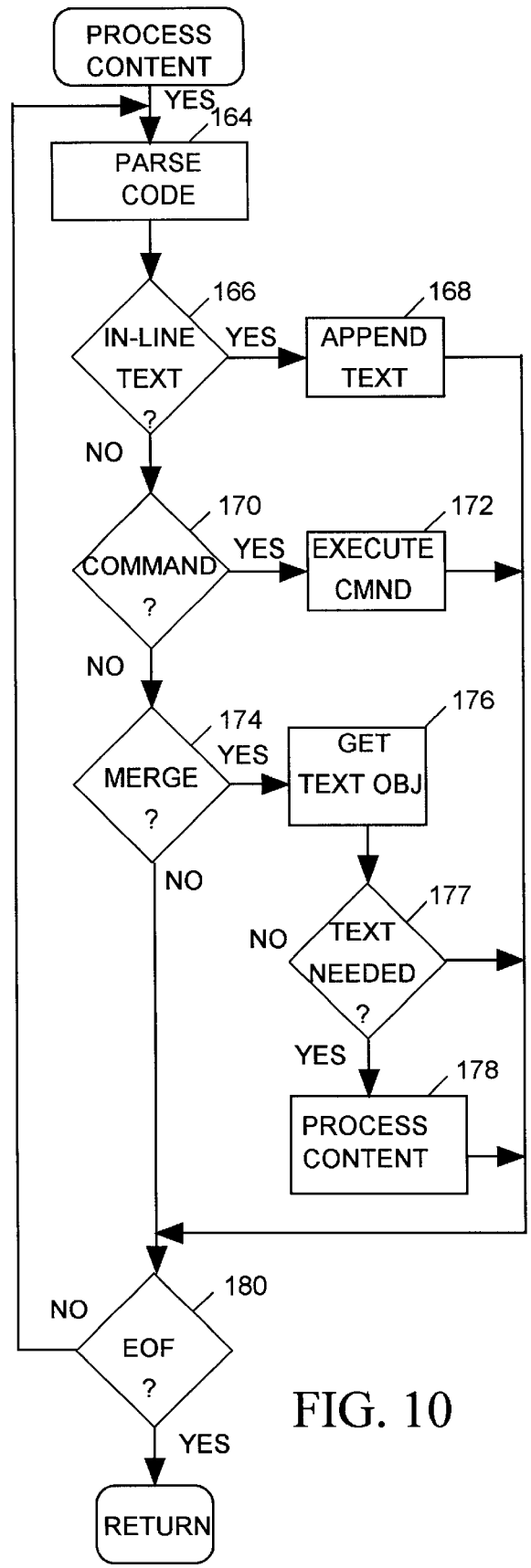
FIG. 10 is a flow chart illustrating the "process content" subroutine called by the main routine of FIG. 9.

FIG. 10 is a flow chart illustrating the "process content" subroutine called at step 152 of the main routine of FIG. 9. The text generating code of a form object 22 or a text object 24 may be "in-line" text, a command, or a merge statement. Interpreter 26 parses text generating code included in the form to obtain a first command or block of text (step 164). If a code block obtained at step 164 is in-line document text not proceeded by a "^" symbol (step 166), interpreter 26 appends the text to the file that is to be sent to the printer (step 168). Commands and MERGE statements begin with the "^" symbol. If the block of code is a command other than a ^MERGE command (step 170), interpreter 26 executes the command (step 172). Formatting commands tell interpreter 26 to append printer format control codes to the document file 27 to control formatting of text and include, for example format control codes may indent paragraphs or create paragraph headings. A flow control command such as an ^IF( ) command tells interpreter 26, for example, to evaluate a statement to determine whether to process or skip a block of code. As discussed above, various ˆMACRO commands tell the interpreter to create document, party or signature definition objects. Other ˆMACRO commands or procedures can insert structures such as headers, logos, an index, a terms definition list or other structures into the document. Commands such as ˆ(DocST) or ˆ(BeginSubjDp1) tell interpreter 26 to invoke procedure of input data object 20, party definition object 62, document definition object 50, or signature definition object 67.

When the block of code obtained at step 164 is a MERGE command referencing a text object 24 (step 174), interpreter 26 obtains the referenced text object (step 176) and evaluates its selection block to determine if the text it generates is needed (step 177). If so, the process content routine recursively calls itself and processes the content of the text object (step 178). If, after processing code at steps 168, 172, 177 or 178 interpreter 26 has not reached the end of the file (EOF) of the form or text object being processed (step 180), it returns to step 164 to obtain a next block of text, command or MERGE statement to be processed. The process content routine returns to its caller at step 180 when all text generation code has been processed.

System Maintenance

The modular organization and structure of document assembly system 10 simplifies the job of programmers when creating new documents or changing the content or structure of documents for example to reflect changes in laws, regulations, legal decisions, company policies and common practices that affect those documents. By grouping procedures into party-related, signature-related and document-related macros 34, 36 and 38, it is easy to accommodate changes to the manner in which the system handles party-related, signature-related and document-related a language without having to make changes to thousands of text generators that might produce such text containing such language. For example all of the source code that controls the manner in which documents refer to parties is included in the party definition macro 34 of FIG. 2. If a new law in one state changes the way certain documents refer to a party under some conditions, it is necessary for the programmer to change only the code in applicable procedures of the party definition macro 34. It is not necessary for the programmer to modify any form generator 30 or text generator 32 that generate the document text. Or, for example, all of the source code that determines how signature blocks are produced is included in the signature definition macro 36. When there is a change in the way signature blocks are to be produced, it is necessary for the programmer to change only the code signature definition macro code. It is not necessary to change any code in the form generators 30 or text generators 32. To create a new document, it is necessary for the programmer to create only a new form generator 30 and one or more new text generators 32 for producing any new text for the document not otherwise produced by an existing text generator.

What is claimed is:

1. A method for a computer for generating a document file containing a block of text describing a transaction between a plurality of parties, the method including the steps of:

creating a plurality of party definition objects (62), each corresponding to a separate one of said plurality of parties and each including executable party definition procedures for generating text associated with the corresponding party;

creating an executable first text object (24) for generating said block of text, including text associated with each of said parties and other text, said first text object generating said text associated with each of said parties by invoking execution of ones of said party definition procedures; and creating an executable form object (23) for generating said document file including generating said block of text by invoking execution of said first text object.

2. The method in accordance with claim 1 wherein said first text object includes said other text.

3. The method in accordance with claim 1 further comprising the step of creating an executable second text object (24) for generating a portion of said other text, wherein said first text object generates said portion of said other text by invoking execution of said second text object.

4. The method in accordance with claim 1 wherein one of said party definition procedures of each party definition object generates text referring to a party corresponding to the party definition object.

5. The method in accordance with claim 4 wherein another of said party definition procedures of each party definition object generates text to be used to be used as a verb in a sentence having as its subject said text referring to a party corresponding to the party definition object.

6. The method in accordance with claim 1 wherein one of said party definition procedures of each party definition object generates text to be used to be used as a verb in a sentence having as its subject a word referring to the party corresponding to the party definition object.

7. The method in accordance with claim 1 wherein said other text includes a verb and wherein one of said procedures of one of said party definition objects generates at least one character to be appended to said verb.

8. The method in accordance with claim 1 wherein said document file contains a definition of a signature block to be signed by one of parties, wherein the method further comprises the step of creating a signature definition object (67) comprising an executable signature definition procedure for generating said definition said signature block, wherein said form object also invokes said signature definition procedure.

9. The method in accordance with claim 1 wherein said method further comprises the step of creating a signature definition object (67) comprising an executable signature definition procedure for generating a definition of a signature block to be signed by one of said parties, wherein said form object also invokes said signature definition procedures and includes the signature block definition generated by the invoked signature definition procedure in the document file generated by said form object.

10. A method for a computer for generating a plurality of document files, each containing at least one block of text describing a transaction between a plurality of parties, the method including the steps of:

creating a plurality of party definition objects (67), each corresponding to a separate one of said plurality of parties and each including executable party definition procedures for generating text associated with the corresponding party;

creating a plurality of executable text objects (24), each for generating a separate block of text including text associated with each of said parties and other text, each text object generating text associated with one of said parties by invoking execution of one of said party definition procedures; and creating a plurality of executable form objects (23), each corresponding to a separate one of said document files, for generating the document file including invoking execution of at least one of said first text objects.

11. The method in accordance with claim 10 wherein each of said text objects includes said other text.

12. The method in accordance with claim 10 wherein at least one of said text objects invokes execution of at least one other of said text objects.

13. The method in accordance with claim 10 wherein one of said party definition procedures of each party definition object generates text referring to a party corresponding to the party definition object.

14. The method in accordance with claim 13 wherein another of said party definition procedures of each party definition object generates text to be used to be used as a verb in a sentence having as its subject said text referring to a party corresponding to the party definition object.

15. The method in accordance with claim 10 wherein one of said party definition procedures of each party definition object generates text to be used to be used as a verb in a sentence having as its subject a word referring to the party corresponding to the party definition object.

16. The method in accordance with claim 10 wherein said other text includes a verb and wherein one of said procedures of one of said party definition objects generates at least one character to be appended to said verb.

17. The method in accordance with claim 10 wherein said method further comprises the step of creating a plurality of signature definition objects (67), each comprising an executable signature definition procedure for generating a definition of a signature block to be signed by one of said parties, wherein each said form object also invokes at least one of said signature definition procedures and includes signature definition blocks generated by the invoked at least one signature definition procedure in the document file generated by said form object.

18. A method for a computer for generating a document (12) describing a transaction between a plurality of parties, the method including the steps of:

creating an input data object (20) including first data defining characteristics of said parties, creating a plurality of party definition objects (62), each corresponding to a separate one of said plurality of parties and each including executable party definition procedures for generating text associated with the corresponding party in accordance with said first data;

creating a plurality of executable text objects (24), each for generating a separate block of text, wherein a block of text generated by at least one of said text objects includes text associated with at least one of said parties invoking execution of at least one of said party definition procedures;

creating an executable form object (23) for generating a document file defining said document, said document file including at least one block of text generated by one of said text objects, wherein said form object selects and invokes execution of at least one of said text objects to obtain said at least one block of text;

invoking execution of said form object such that said form object generates said document file; and printing said document in response to said document file.

19. The method in accordance with claim 18 wherein said input data object also includes second data defining characteristics of said transaction, and wherein at least one of said text objects adjusts the text block it generates in response to said second data.

20. The method in accordance with claim 18 wherein said input data object also includes second data defining characteristics of said transaction, and wherein said form object selects said at least one of said text objects to execute in response to said second data.

\* \* \* \* \*